US007165058B2

(12) United States Patent
Coen (10) Patent No.: US 7,165,058 B2
(45) Date of Patent: Jan. 16, 2007

(54) DATABASE ANALYSIS TOOL

(75) Inventor: Gary A. Coen, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 360 days.

(21) Appl. No.: 10/032,817

(22) Filed: Dec. 27, 2001

(65) Prior Publication Data

US 2003/0126106 A1   Jul. 3, 2003

(51) Int. Cl.
*G06F 17/30* (2006.01)

(52) U.S. Cl. ........................................................ 707/1

(58) Field of Classification Search ................ 707/102; 704/10
See application file for complete search history.

(56) References Cited

U.S. PATENT DOCUMENTS

| | | | |
|---|---|---|---|
| 5,724,594 A * | 3/1998 | Pentheroudakis | 704/10 |
| 6,263,334 B1 * | 7/2001 | Fayyad et al. | 707/5 |
| 6,446,081 B1 * | 9/2002 | Preston | 707/104.1 |

OTHER PUBLICATIONS

Authors: F. Can and E. Ozkarahan; Title: A dynamic cluster maintenance system for information retrieval; Date: 1987; Publisher: ACM Press, NY USA; pp: 123-131.*
Authors: V. Raghavan and M.Y.L. Ip; Title: Techniques for measuring the stability of clustering: a comparative study; Date: 1982;Publisher: Springer-Verlag, NY USA; pp: 209-237.*
Amit Bagga, 'The Role of a GUI in The Creation of a Trainable Message Understanding System', Nov. 1997, Proceedings of the 1997 conference of the Centre for Advanced Studies on Collaborative research, pp. 1-11.*
Brian Hayes, 'The Web of Words', Mar.-Apr. 1999, American Scientist vol. 87, No. 2, pp. 108-112.*

* cited by examiner

*Primary Examiner*—Don Wong
*Assistant Examiner*—Cheryl Shechtman
(74) *Attorney, Agent, or Firm*—Lee & Hayes, PLLC (57) ABSTRACT

A system and method are provided for viewing a data dictionary's structure. The system includes a processor coupled to a database and a display. The processor determines all lexical nodes of a retrieved data dictionary that includes terms and term definitions, then parses each term's definition. Next, the processor determines dependencies of each lexical node based on the parsed definitions and the terms associated with the other lexical nodes, and generates a lexical graph based on the determined lexical nodes and the determined dependencies. Then, at least a portion of the generated lexical graph is presented on the display.

28 Claims, 11 Drawing Sheets

DATABASE ANALYSIS TOOL

FIELD OF THE INVENTION

This invention relates generally to databases and, more specifically, to database analysis.

BACKGROUND OF THE INVENTION

With increasing frequency, information scientists, systems analysts, and other knowledge workers are obliged to quickly acquire broad-based knowledge of unfamiliar information domains, such as old legacy databases. Often knowledge sources are embodied in a stream of open source data, such as a network of World Wide Web sites or a proprietary document repository. When this occurs, the principal impediment to knowledge acquisition can be the sheer volume of textual data that must be navigated.

Absent computational support, workers assigned to such enterprises are obliged to pore over the documents to extract titles, tables of contents, and indices. Once collated and compiled, this information provides an initial map of the knowledge source, at least for those documents with informative titles, tables of contents, and indices. Other documents must be reviewed independently in order to isolate the same kind of information. This laborious process includes, for each document, a survey of its contents, an evaluation of its contents' suitability to the goals of the investigation, and a prioritization of its information content with respect to the growing body of information about the domain. Because the cost of manual intervention is so high and its result so uncertain, teams of domain specialists are usually required to support these knowledge workers and to increase the general likelihood of success for the collective effort. Knowledge acquisition in unfamiliar domains can be expensive and time-consuming. Therefore, there exists a need to provide a tool to efficiently analyze unfamiliar databases.

Also, data designs inevitably fossilize if their dependency architectures must be modified in order to accommodate change. Unsurprisingly, the key indicator of design fossilization is evident when change to the semantics of one data element propagates change to all semantically dependent data elements. This is characteristic of structured design, where change to low-level details impacts the semantics of high-level policy. As the original dependency architecture decomposes, the nature and extent of this relationship becomes less predictable. When the propagation of semantic change cannot be reliably predicted, the cost of design changes cannot be estimated. Eventually, data and process owners become reluctant to authorize changes, with the result that the change proposals are discouraged and deemed suspect. Ultimately, owners freeze the change management process and the design fossilizes, initializing the final stage in the economic lifetime of the data asset.

One diagnostic for fossilized data designs is that such fossiled designs characteristically propagate semantic change imposed on low-level data elements to higher-level dependents. From the perspective of data and process owners, a design change may give rise to problems that impact aspects of the design that have no conceptual relationship with the changed element. For example, the remedy for one problem may lead to other, seemingly unrelated problems. The quality of data for certain aspects of the design is thrown in doubt, and the potential for data reuse diminishes accordingly. In effect, design fossilization erects a firewall of non-reusability around data assets. Certainly this is not the intended effect.

Therefore, there exists a need to forestall the process of design fossilization and facilitate the productive utilization and reuse of data assets.

SUMMARY OF THE INVENTION

The present invention comprises a system and method for viewing a data dictionary structure. The system includes a processor coupled to a database and a display. The processor determines all lexical nodes of a retrieved data dictionary that includes terms and term definitions, then parses each term's definition. Next, the processor determines dependencies of each lexical node based on the parsed definitions and the terms associated with the other lexical nodes, and generates a lexical graph based on the determined lexical nodes and the determined dependencies. Then, at least a portion of the generated lexical graph is presented on the display.

In accordance with further aspects of the invention, the determined dependencies include at least one of a valid type dependency, a caution type dependency, or a cyclical type dependency. Icons are generated based on the dependency type, then displayed.

In accordance with other aspects of the invention, the processor determines a lexical stability value for each lexical node. The lexical stability value is determined by dividing the number of nodes that lexically depend on a current node by the number of nodes that lexically depend on the current node plus the number of nodes that the current node lexically depends from.

In accordance with still further aspects of the invention, the processor determines an aggregate stability value for each node. The aggregate stability value is determined by adding the lexical stability values of all nodes that are lexically dependent upon the current node to the current node's lexical stability value.

In accordance with yet other aspects of the invention, the processor determines a global stability value by summing the lexical stability values of all nodes of the generated lexical graph and determines a fractional stability value for each node based on the determined aggregate and global stability values. The fractional stability value is determined by dividing the current node's aggregate stability value by the global stability value.

In accordance with still another aspect of the invention, the processor allows modification of the definition associated with a term of one or more lexical nodes.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
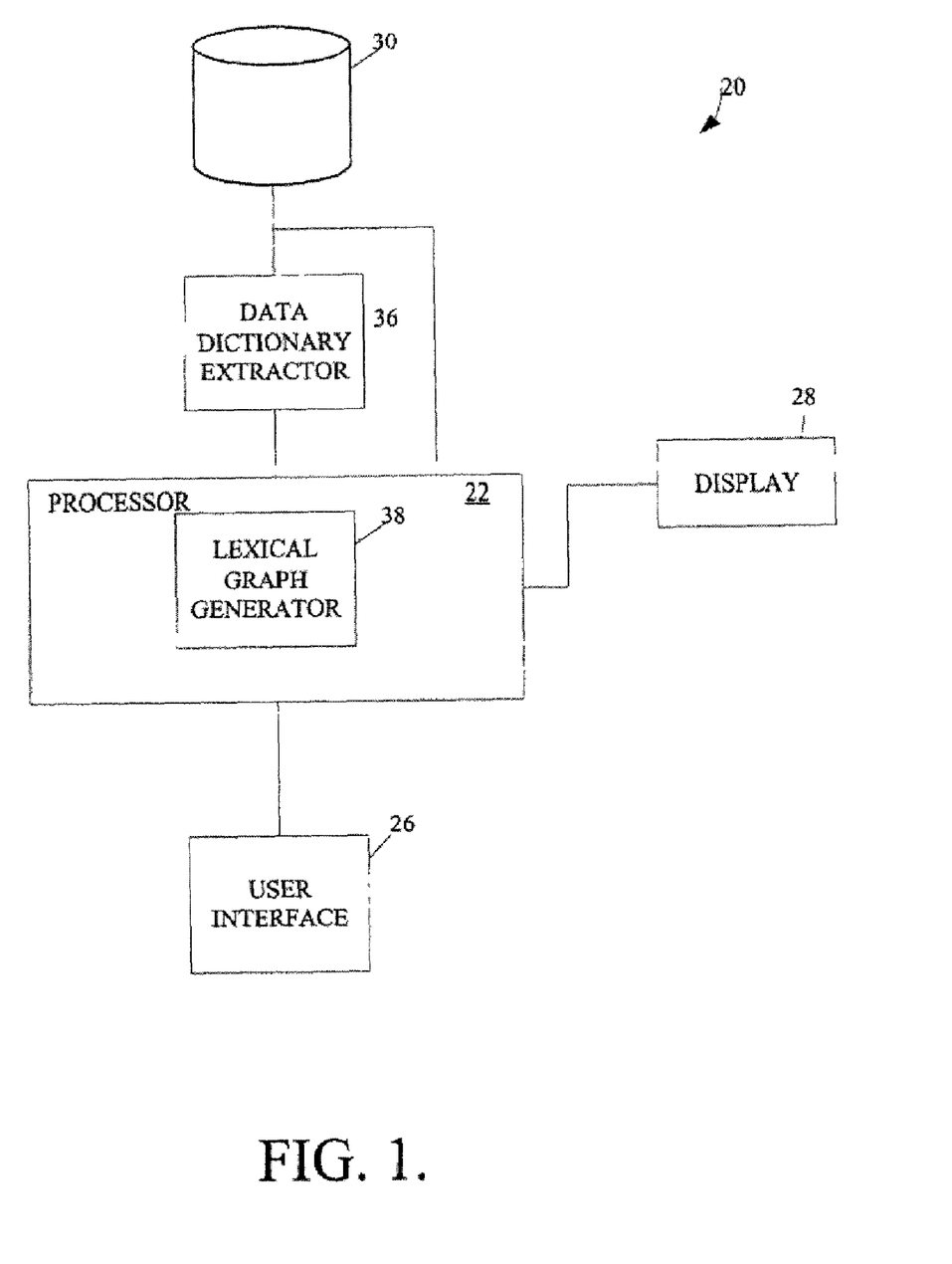
FIG. 1 is a system block diagram of the present invention.

The present invention provides a software tool for analyzing data integrity within a database and editing that data. FIG. 1 illustrates an example system 20, a general-purpose computer, used to execute the functions of the present invention. The system 20 includes a processor 22, a user interface 26, a display 28, a data dictionary extractor 36, and a database 30. The database 30 includes any of a number of relational databases that includes a data dictionary or data relationships needed to generate a data dictionary. The processor 22 includes a lexical graph generator 38. The data dictionary extractor 36 retrieves or generates a data dictionary in text form from the database 30 and delivers the dictionary to the lexical graph generator 38 for processing. The lexical graph generator 38 generates a lexical graph in a graphical user interface (GUI) using the data dictionary extracted by the extractor 36 or retrieved directly from the database by another program and presents the graph on the display 28 which is coupled to the processor 22. An example lexical graph is shown in a graphical user interface in FIGS. 8–13 below. The process and the algorithms used by the lexical graph generator 38 are described in more detail below with respect to FIGS. 3–7. The user interface 26 is coupled to the processor 22 and is any one of a number of user interface devices, such as a keyboard, a mouse, a touch screen device, or any other user interface input device.

Figure 2:
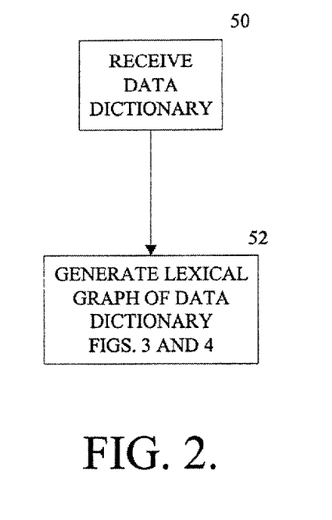
FIGS. 2–4 are flow diagrams illustrating the process performed by the present invention.
Figure 3:
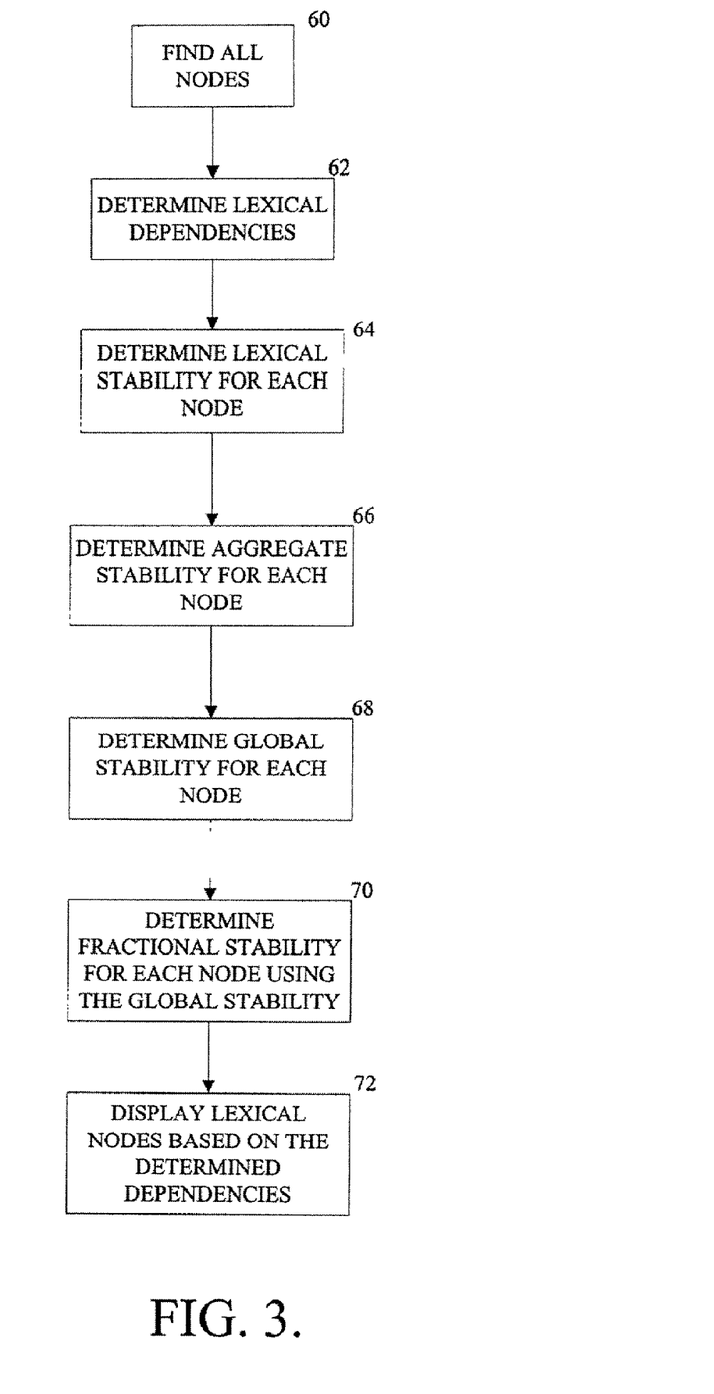
Figure 4:
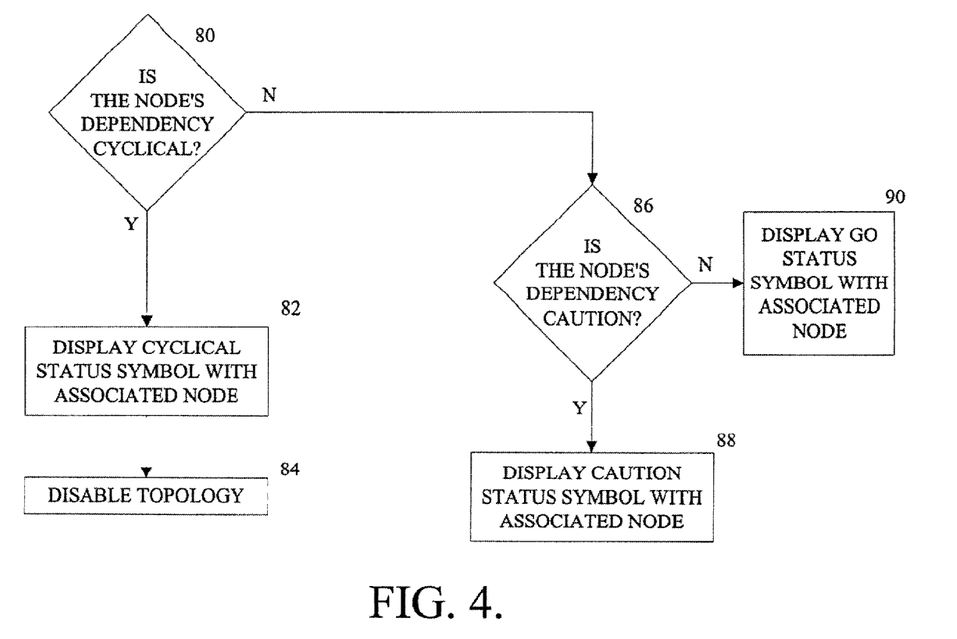

FIG. 2 illustrates a process performed by the system 20 shown in FIG. 1. First, at block 50, the processor 22 receives a data dictionary. This is performed by using the user interface 26 to select a data dictionary stored in the database 30 or a program, such as Erwin, generates a data dictionary from a relational database store in database 30. Next, at block 52, the system 20 generates a lexical graph of the data dictionary. FIGS. 3 and 4 describe in greater detail the functions performed at block 52.

The data dictionary includes a list of terms and definitions. Referring to FIG. 3, first, at block 60, the lexical graph generator 38 finds all terms and definitions in the received data dictionary. The generator 38 extracts term definition pairs from the dictionary. Each term definition pair becomes a lexical graph node. Next, at block 62, the generator 38 determines lexical dependencies for each of the nodes after all nodes are determined. A dependency is determined by parsing the text in each term's definition and determining if the term of any other node is defined in that definition. This will be described in more detail below. At block 64, the generator 38 determines lexical stability for each node. This will be described in more detail below. Then, at block 66, the generator 38 determines aggregate stability for each node. Aggregate stability will be described in more detail below. Next, at block 68, a global stability value is determined. The global stability value is used at block 70 to determine fractional stability for each node. Fractional stability will be described in more detail below. Then, at block 72, the system 20 displays the lexical graph nodes based on the determined dependencies. Also, the definitions and the determined lexical, aggregate, and fractional stability are displayed.

FIG. 4 illustrates an example process that the generator 38 uses for identifying a status symbol, icon, to display next to each node. First, at decision block 80, the generator 38 determines if any cyclical dependencies exist. A cyclical dependency occurs when the definition of a first term includes the term for a second term and vice versa. If at decision block 80, it is determined that even one cyclical dependency occurs, then, at block 82, a cyclical status icon is presented on the display. Also, a cyclical status icon is presented with the nodes that exhibit a cyclical function. Also, at block 84, a topology generation process is disabled when a cyclical dependency occurs. Topology will be described in more detail below.

If at the decision block 80 it is determined that no cyclical dependencies occur, then the generator determines if there are any caution dependencies, at decision block 86. If at the decision block 86 it is determined that a caution dependency occurs at a node then, at block 88, a caution status symbol icon is displayed with the associated node. The determination of a caution for a node is described in more detail below. If at the decision block 86 it is determined that no caution dependencies occur for a node, then at block 90, the node is displayed with a go icon. Examples of cycle, caution, and go icons are illustrated in FIGS. 8–11. The steps of FIGS. 3 and 4 are not required to be performed in the order shown, but could be performed in any of a number of different orders without departing from the spirit and scope of the present invention.

Graph theory for the present invention is as follows. A lexical graph is a directed graph $L=(D, E)$ where each pair in D is a node in L, and E is a binary relation on D. D is a data dictionary, that is a finite set of strings arranged as ordered pairs (t, d) such that each d identifies the essential meaning of its t. Here, t means a term from the data dictionary and d is term definition.

A graph G is an ordered pair (V, E), where V is a finite set of vertices and E is a binary relation on V composing a set of edges. An edge is a pair (u, v) with u, v $\in$ V. If edge e=(u, v) is in graph G, then u and v are said to be the end vertices of e.

An edge is directed if its end vertices are an ordered pair. Suppose that e is an outgoing edge of u and an incoming edge of v. A specialized edge like e is an arc, and its specialized end vertices are nodes. A directed graph is a graph in which all edges are arcs. If arcs e=(u, v) and e'=(u, w) exist in a directed graph, then e and e' are incident to node u. The degree of node u, d(u), is the total number of arcs incident to u. Moreover, the incoming degree of u, $d^-(u)$, is the total number of incoming arcs incident to u, and the outgoing degrees of u, $d^+(u)$, is the total number of outgoing arcs incident to u.

In a directed graph G=(V, E), a walk is a sequence between end nodes of one or more arcs, and a path is a walk in which all nodes are distinct. Node v of G is reachable from node u if v=u or G contains a path from u to v. A subgraph S of G has all its arcs and nodes in G. A directed subgraph S of G rooted at v is a directed graph S=(V', E') where v $\in$ V, V'$\subseteq$V, E'$\subseteq$ E, and V' is the set of nodes from which v is reachable. Finally, a cycle is a walk in which the first and last nodes are identical while all others are distinct, and a directed acyclic graph is a directed graph without cycles.

Since the end nodes u, v of each arc in E are also ordered pairs, a more precise notation for an arc in a lexical graph is needed. Let each arc in E be annotated as e=((t, d), (t', d')). Then, whenever e $\in$ E of L, (t, d) can be said to depend on (t', d').

Lexical Dependency

Applying the foregoing description of lexical graph L, suppose lexical dependency exists between nodes (t, d) and (t', d ') whenever t' occurs as a substring of d in the arcs of L. (The substring relation suffices for expository purposes, but lexical dependency can be formulated in terms of other relations as well.) Thus, lexical dependency occurs whenever one term's definition uses another term under definition in the dictionary. If a directed graph contains a cyclical dependency, then it cannot be a lexical graph and the semantics of its dictionary are undefined. Because of this, detection of cyclical dependency is a decisive operation in the present invention. In database lexicography, cyclical dependency suffices as a general diagnostic of undefined semantics.

Logical entailment is involved in lexical dependency. Whenever one node lexically depends on another, it is impossible to know the meaning of the dictionary term defined by the one node without prior knowledge of the meaning of the term defined by the other node. Mathematically, a lexical dependency relation defined on L imposes a topology on its dictionary. Each (t, d) pair in D identifies the information structure of a term under definition, and whenever an element in D lexically depends on another element to ground its meaning, a corresponding arc exists in E. Hence, lexical dependency intrinsically orders D: whenever e=((t, d), (t', d'))∈E of L, it is clear that (t', d') precedes (t, d) in the topology of D. Thus, knowledge of the meaning of an element in a dictionary topology cannot be guaranteed without prior knowledge of the meaning of every preceding element in that topology.

A dictionary topology provides immediate value to the data management enterprise. On the one hand, it represents a learning sequence for the concepts encoded in the metadata-dictionary terms. On the other hand, it orders physical model entities in table loading sequence, a calculation critical to the data population process.

Lexical Stability

This section describes in more detail the step performed at block 64 of FIG. 3. Once a lexical graph structure is discovered, the dependency architecture of the underlying data design is evaluated. The evaluation includes quantifying the stability of each node in the lexical graph. Stability is generally construed as a measure of the effort required to validate semantic change to the corresponding dictionary entry. The results are interpreted as figures of merit for the data design. Alternatively, the evaluation may reveal local points of decomposition in its dependency architecture. This information then serves to guide corrective actions intended to fortify the design against fossilization.

Figure 5A:
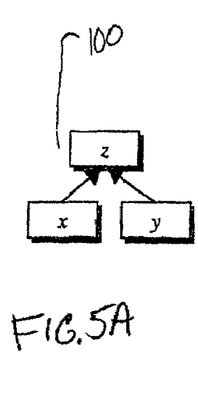
FIGS. 5–7 are lexical graphs that illustrate features of the present invention.

Intuitively, the lexical stability property of a particular node in a lexical graph is a discrete, local measure of the amount of work required to modify the semantics of its dictionary entry. In a lexical graph L, the stability of v, v ∈ D, expresses the work effort any modification to the lexicographic information in v will require to validate the impact of that change on the immediate dependents of v. To illustrate, as shown in FIG. 5A, a simple lexical graph 100 is shown with three nodes x, y, and z. Nodes x and y lexically depend on z, and z is lexically independent. Clearly, the meaning of x and y can change without affecting the meaning of z. Moreover, no change in x will affect the meaning of y, and vice-versa. However, a change to z may reformulate the meaning of both x and y, transforming the structure and content of L to an extent measured by the stability of z. Alternatively, a potential side effect of change to nodes x and y, which follow z in the dictionary topology, is that they may no longer follow z in the topology afterward, depending on the nature of the change to dictionary elements x and y.

Measuring Lexical Stability

The interdependencies between nodes in a lexical graph determine the global information structure of the graph as well as local information structure of each node. The degree of node v, d(v), is the total number of arcs incident to v. Likewise, d⁻(v), the incoming degree of v, summarizes the incoming arcs of v. The lexical stability of node v, S(v), is then the quotient of dividend d⁻(v) and divisor d(v):

$$S(v) = \frac{d^-(v)}{d(v)} \quad (1)$$

where v is a node in lexical graph L=(D, E)

Application of this measurement to lexical graph 100 indicates S(z)=1, the maximal value for lexical stability, while S(x) and S(y) both yield 0, the minimal value. As lexical stability approaches the maximum, change to the information concept encoded in a dictionary node has more pervasive effects on the structural configuration of the lexical graph. As a practical matter, a high lexical stability value local to some node v implies difficulty of change for the dictionary entry encoded at v, since node v and each of node v's adjacent nodes must be reviewed for correctness subsequent to the change. Conversely, a reduced burden of validation accompanies modification of a node with lower lexical stability. Hence, low lexical stability implies ease of change. Conversely, high lexical stability implies difficulty of change for a dictionary entry.

Consistent with this framework of evaluation, maximum and minimum stability values are assigned to the root and leaf nodes, respectively, of a lexical graph. This is an intuitive result. By definition, orphans (i.e., isolated lexical graph nodes where d(v)=0) possess minimum lexical stability.

Figure 5B:
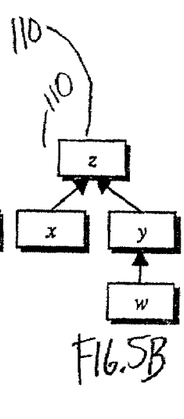
Figures 5C, 5D:
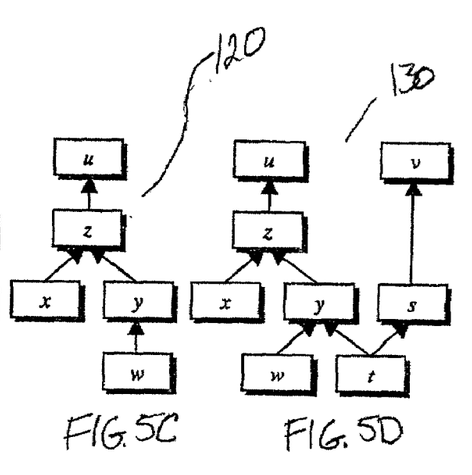

Lexical graph 110 from FIG. 5B is similar to graph 100 but with a node w that depends on y. Again, the calculation of S(v) identifies minimal stability for the leaf nodes of the new configuration. Node w depends on y and y depends on z, and the calculation identifies a higher lexical stability value for z than y: S(z)=1 and S(y)=0.5. Moreover, each lexical dependency added to node y increments S(y) appropriately, although S(y) will never achieve the maximum value. Hence, S(z) exceeds S(y) in lexical stability, another intuitively appropriate result. As shown in FIG. 5C, a lexical graph 120 is similar to graph 110 but node z depends on node u, a new root node. In this configuration, S(z) is devalued to 0.66 and S(u)=1. Nodes w, x, and y are the dictionary entries easiest to change, and they retain their previous lexical stability values.

Finally, at FIG. 5D, lexical graph 130 extends graph 120 by adding a dependent node t to y and making t dependent on an additional node s. The new node s, in turn, depends on a third additional node v. As in lexical graphs 100–120, the two root nodes u, v of graph 130 have maximal stability. Nodes x and w remain leaf nodes, and thus retain minimum lexical stability. S(y) has increased to 0.66, reflecting the additional lexical dependent t. Node z presents the same configuration as y, hence S(z)=0.66. Node s has identical incoming and outgoing degrees; hence, its lexical stability is 0.5.

Lexical Stability and Information Structure

Lexical stability is local to a node in a lexical graph. Should modification of a node change its relationship to another node, the topology of the dictionary may change. Not every change has structural consequences. A change in a leaf node or an orphan may be trivial, as the minimum lexical stability value of such nodes attests. On the other hand, some changes may have intricate consequences throughout the dictionary. Modification of a node with high incoming degree positioned near a root, for instance, may have a significant impact on the information structure of a dictionary.

Formally, modification of lexical graph L is accomplished by creating, updating, or deleting one or more elements in D. Suppose two nodes v=(t, d) and w=(t', d') exist, where v, w ∈ D and v lexically depends on w. Whenever a node lexically depends on another, a corresponding arc e=((t, d), (t', d')) appears in E. Should v change such that it no longer depends on w, then e ∉ E. Should v change such that it retains its dependency on w and adds a new dependency x=(τ, δ), where x ∈ D, then a new arc e=((t, d), (τ, δ)) appears in E. Thus, E contains the extension of a binary relation on D, and this relation expresses the intrinsic information structure of D.

Lexical stability and information structure is factored independently in the evaluation of a dictionary. For example, suppose the node z in lexical graph 130 were changed such that the node z no longer depends on u. This modification changes the lexical stability values of nodes u and z to 0 and 1, respectively. No other stability values change. However, since z no longer depends on u, the transitive closure of lexical dependencies by which x, y, w, and t had previously related to u is disrupted. Because of the change in z, these nodes no longer base their definienda in whole or in part on u. Clearly, the information structures of x, y, w, and t have changed, although their lexical stability measurements remain fixed. Since information structure can change independently from lexical stability, information structure and lexical stability are factored independently in lexical graphs.

Except for orphans in a lexical graph, the meaning of a dictionary element/node is partially determined by its information structure. Thus a modification of v, v ∈ D, entails the possibility of change in meaning for v as well as for any other node u, where u is an element of the subgraph rooted at v. This is true because the information structure of u grounds its meaning in the information structure of v. Should v be positioned strategically within the global information structure of L- for instance, as the single root of L- then modification of v may transform the meaning of every term under definition in the dictionary.

Aggregate Stability

Since a lexical graph L=(D, E) is a specialization of a directed acyclic graph, it follows that the subgraph of L rooted at v is a lexical graph L'=(D', E') where v ∈ D, D'⊆D, E'⊆E, and D' is the set of nodes from which v is reachable. Node v is reachable from node u if v=u or L contains a path from u to v. More formally, v is reachable from u if v is identical to u, v is adjacent to u, or there is some set of arcs E'=((u, $x_i$), ($x_i$, $x_{i+1}$), ..., ($x_n$, v)) that connect the nodes u, v, E'⊆E, where $x_i$ and $x_{i+1}$ are distinct and adjacent for i= (0, ..., n). Thus for each node v, the contribution the subgraph rooted at v is isolated and the contribution of subgraph to the global information structure of L is quantified. The quantified contribution is the aggregate stability S[v]:

$$S[v] = \sum_{x \in D'} S(x). \quad (2)$$

Hence, the aggregate stability of v measures the transitive closure of lexical dependency relations within the subgraph rooted at v. Thus the aggregate stability property serves as a crude comparator discriminating between nodes on the basis of their contribution to the global information structure of the lexical graph. Where S[v]>S[v'], the global information structure of L is more sensitive to modification of v than v'.

Since multiple roots are common in lexical graphs, aggregate stability permits the definition of a partially ordered set (D, S[v]) that might be applied as a comparator between subgraphs, thus identifying an aggregate stability value for each subgraph of a multiply rooted lexical graph. Hence, the aggregate stability partitions the dependency architecture into component information structures where each substructure contributes a discrete amount to the global information structure of the lexical graph.

Global Stability

The global stability of a lexical graph, GS(L), is the sum of all S(v) in L:

$$GS(L) = \sum_{v \in D} S(v). \quad (3)$$

Global stability may, for instance, be employed to characterize lexical graphs on the basis of the inherent integration of information concepts within their respective dictionaries. Where D of two lexical graphs is equivalent, GS(L) is greater for the lexical graph with the greater interdependency between dictionary entries. A similar comparator for arbitrarily selected lexical graphs is the relative global stability of each graph L, GR(L), which expresses the relative integration of information concepts within any lexical graph:

$$GR(L) = \frac{GS(L)}{|D|} \quad (4)$$

Where GR(L)>GR(L'), the information structure of L encodes a greater interdependence of information concepts than that of L'. As a practical matter, whenever GR(L) is relatively high or low, dictionary D of L will demonstrate a commensurately high or low level of conceptual integration.

Fractional Stability

The aggregate stability value and the global stability are used to express the fraction of a lexical graph's global stability contributed by the information structure of some discrete node. This is the fractional stability of a node v, FS(v):

$$FS(v) = \frac{S[v]}{GS(L)} \quad (5)$$

Except if d(v)=0, then FS(v)=0.

Figure 6:
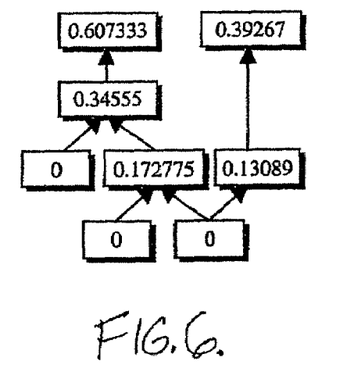

Fractional stability provides an insightful discriminator for the information concepts encoded in a dictionary. Fractional stability imposes a weak partial order on the elements of D, identifying for each node a value in the interval between 0 and 1. FIG. 6 illustrates fractional stability values calculated for the nodes of graph 130.

The fractional stability relation exposes this lexical graph property measurement, enabling a scalar distribution of the information concepts encoded in a dictionary. Dictionary elements arranged at the lower end of the scale have information structures with few or no dependents. Meaningful change to their semantics can be introduced without effect on the remainder of the dictionary. In this sense, elements at the lower end of the scale are peripheral information concepts with respect to the global information structure of the dictionary. As for the information concepts arranged at the higher end of the scale, meaningful change to their semantics will be broadly propagated throughout the information structure of the dictionary. Hence, these elements encode the core information concepts of the dictionary.

Lexical Dependency Inversion

Figure 7A:
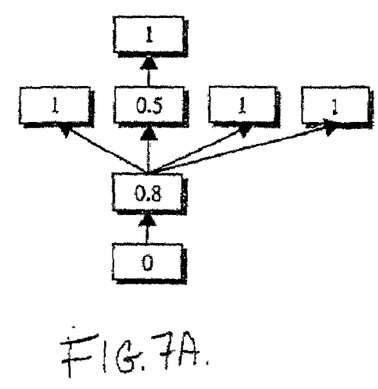
Figure 7B:
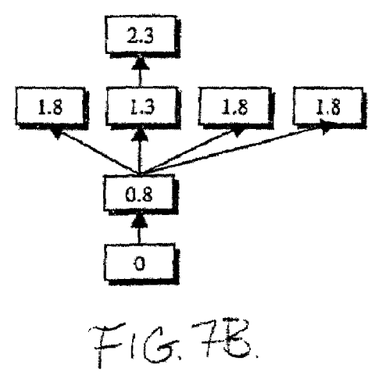

The present invention provides a discrete method of distinguishing between desirable and undesirable forms of semantic dependency. When an undesirable semantic dependency occurs in a data dictionary, dependency architecture characteristically exhibits a particular structural flaw: a metadata element (a node) that is relatively stable with respect to the information structure of the lexical graph semantically depends on a significantly less stable element. FIGS. 7A and B illustrate a simple case of lexical dependency inversion. FIG. 7A shows each node's lexical stability values and FIG. 7B shows each node's aggregate stability values. A node in FIG. 7A has lexical stability value of 0.8 and that node semantically depends on a node a value 0.5 stability value. The semantics of the 0.8 node is relatively easy to change. Any change to the 0.5 node is propagated throughout the subgraph of its dependencies, and this may unintentionally transform the meaning of more stable metadata/nodes occurring elsewhere in the lexical graph. The determination performed at decision block 86 of FIG. 4 is a determination if the node is experiencing a lexical dependency inversion.

The analysis of semantic dependency has multiple dimensions. Locally, lexical stability measures the work required to validate the impact of semantic change on the immediate dependents of a changed metadata element. More expansively, aggregate stability extends this measurement to partitions of the metadata dependency architecture, measuring the work required to validate semantic change to a metadata element with respect to all of its clients, both immediate and those mediated via transitive closure of lexical dependency relations. Both metrics discriminate between stable and volatile metadata, but neither independently captures the distinction between desirable and undesirable semantic dependency. Instead, both dimensions of analysis must be combined to formally express the difference between desirable and undesirable semantic dependencies. Let the undesirable form be known as a lexical dependency inversion. If v and d are nodes in a lexical graph such that d lexically depends on v and $S[v]-S[d]>=S(d)$, then the relation between v and d flows in the direction of stability; otherwise, the relation is inverted. Using the above, a lexical dependency inversion is identified in FIGS. 7A, B. By comparing the difference of the aggregate stability values of the two nodes at issue in FIGS. 7A and B (i.e., $S[v]=1.3$ and $S[d]=0.8$) with the lexical stability of the dependent node (i.e., $S(d)=0.8$), it exposes the fact that $S[v]-S[d]=0.5$ in this case. Therefore, $S(v)<S(d)$, and a lexical dependency inversion is identified.

Figure 7C:
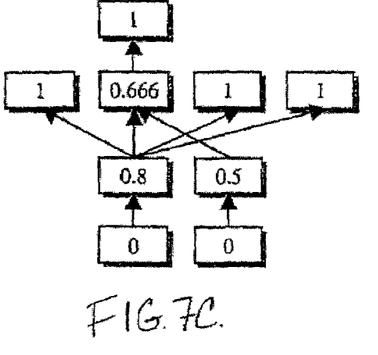
Figure 7D:
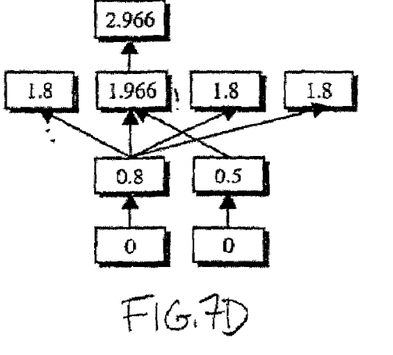

FIGS. 7C and D show lexical and aggregate stability values, respectively, for a lexical graph similar to the graph in FIGS. 7A and B. There is a difference in that the original 0.5 lexical value and the node v has a second dependent node with a 0.5 lexical value and the node v now has a 0.666 lexical value. $S[v]=1.966$, $S[d]=0.8$, and the difference of these aggregate stability values is greater than the lexical stability of the dependent node (i.e., $S(d)=0.8$). In this case, no lexical dependency inversion is found.

Remedying Lexical Dependency Inversion

Figure 7E:
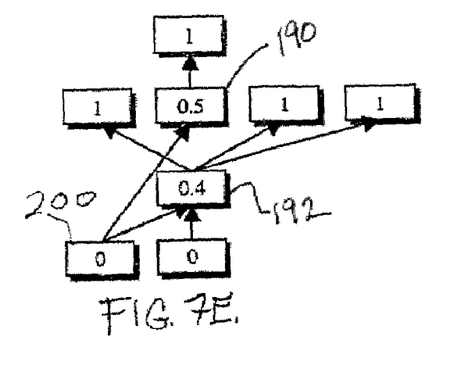

Since lexical dependency is a form of semantic dependency, a transitive relation, the changes are thereafter transmitted throughout the client dependency subgraph. Propagation of change is not always desirable, thus a control mechanism is needed to stem it when desired. One way to assert such control is to insert a design entity that functions as a semantic interface between nodes at the site of an inversion. The lexical graph in FIG. 7A exhibits a lexical dependency inversion in the relationship between the metadata elements (nodes) labeled with lexical stability value 0.8 and 0.5. As shown in FIG. 7E, an additional design entity node 200 is inserted in the graph of FIG. 7A and node 200 functions as a semantic interface between the two nodes (parent node 190 and child node 192) of the inversion. Introduction of node 200 remedies the inversion. The design entity node 200 functions as a semantic interface is introduced as a leaf node. Node 200 semantically depends on the nodes that had formerly been in the lexical dependency inversion. This means that the data dictionary entry associated with newly introduced node 200 semantically depends on the entries of both nodes formerly involved in the inversion. Additionally, no nodes semantically depend on this semantic interface—it remains semantically independent with minimal lexical stability. Finally, the dictionary entry of node 192 no longer refers to node 190. Under these conditions, no change to node 190 propagates node 192 unless the behavior of the semantic interface mandates it. A kind of firewall for containment of semantic change has thus been erected.

In effect, the introduction of a semantic interface defeats the coupling that had previously existed between the two nodes at issue in the inversion. Nevertheless, the semantic interface must respect the logic of inheritance, aggregation, and existential entailment encoded in the metadata like any other element of the dependency architecture. It is distinctive solely in its treatment of semantic dependency. Each semantic interface is responsible to encapsulate and control the details of semantic dependency that had previously related its server (parent) and client (child) metadata elements. With respect to implementation details, the data dictionary defines a semantic interface in terms of an association between its server and client metadata elements. This definition guarantees that specific details of the former semantic relationship between server and client will be respected by the semantic interface.

Each created semantic interface maintains three resources: (i) a representation of the properties of the former server; (ii) a representation of the properties of the former client; and (iii) a correspondence function capable of signaling an exception when the logical criteria in (i) and (ii) do not hold of its current lexical dependencies. Hence, each semantic interface in the data model is empowered to guarantee continuity of the interface or signal an exception.

In the particular case of semantic interfaces relating two elements of the logical model, substitution of an interface entity for the relationship underlying a semantic dependency suffices to ensure that services provided to clients are unaffected by inadvertent side effects of maintenance actions. When modification of the interface is detected, an exception is signaled. However, when a semantic interface relates at least one element of a physical model, there are special cases that merit more detailed specification. The most notable of these are:

1. When the former server is a domain, the server properties represented by the interface are the server's data type or typed values.

2. When the former server and client are relational variables, the properties represented by the interface are the former server and client headings.
3. Otherwise, when the former server is a relational variable, the server property represented by the interface is the server's heading.

In general, physical model elements like 1 through 3 can be implemented as tables containing associative entities. Judicious programming with triggers, check constraints, and exceptions ensure that domains, headings, and other properties do not change in ways that the original design did not anticipate. Thus metadata elements that depend on them will not be inadvertently affected.

Using these methods, lexical dependency inversions are completely rectified by containing the spread of any semantic change incident to their location in a lexical graph. Once this is accomplished for every inversion in the graph, the data design is open for extension but closed for modification.

Figure 8:
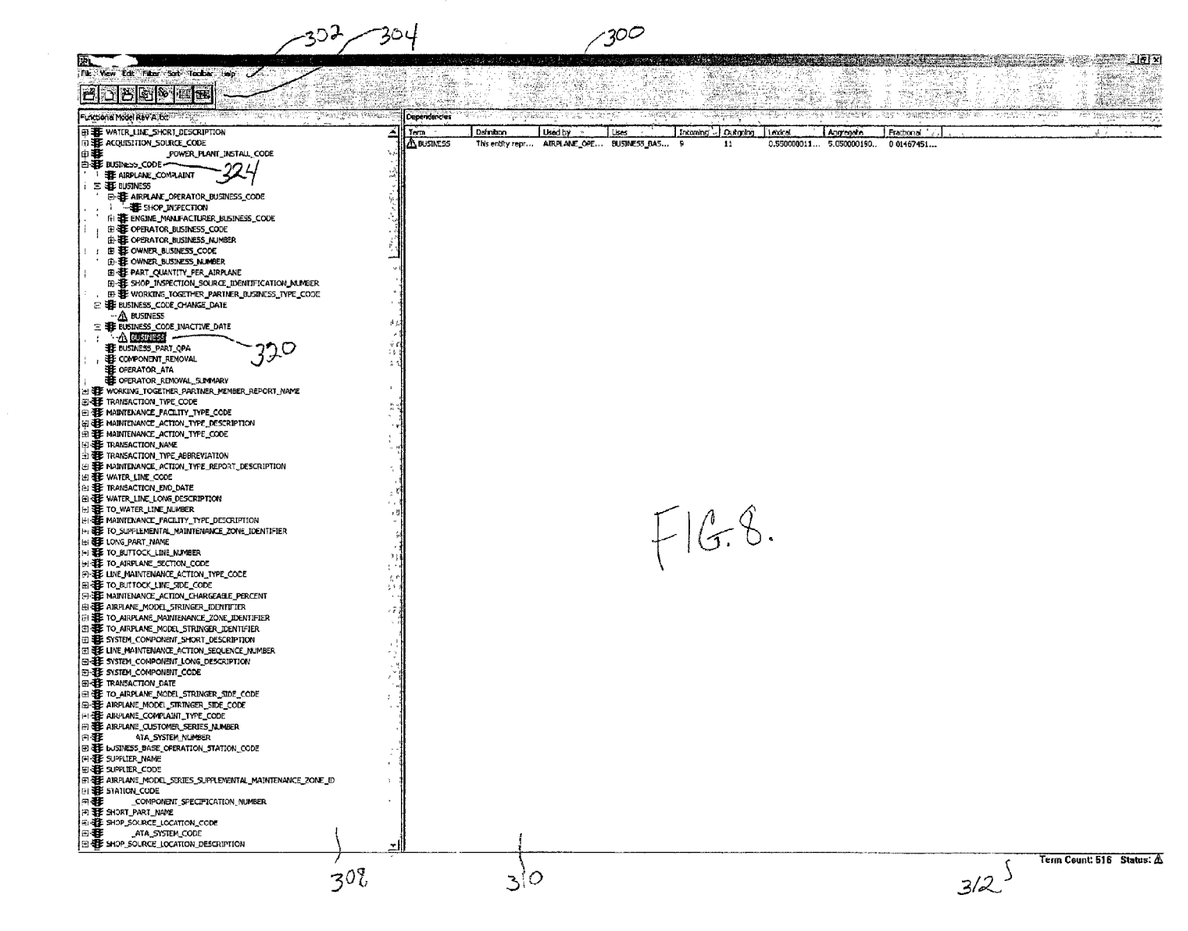
FIGS. 8–13 are screen shots of graphical user interfaces formed in accordance with the present invention.

FIGS. 8–13 are screenshots of a graphical user interface generated by the lexical graph generator 38 for allowing a user to view the structure of an inputted data dictionary and edit the terms and definitions of that dictionary. FIG. 8 illustrates a window 300 that is generated upon processing of a data dictionary. The window 300 is preferably implemented in a Windows-based operating system, such as Microsoft Windows. However, the features that will be described below can be provided in any of a number of different type of graphical user interfaces and operating systems. The window 300 includes pull-down file menus 302, a button bar 304 with multiple buttons, a lexical graph area 308, a dependency area 310, and a status bar 312. The pull-down file menus 302 and the button bar 304 are located above the lexical graph area 308 and the dependency area 310. The dependency area 310 is located adjacent to the graph area 308. The status bar 312 is located at the bottom of the window 300. Other layouts are acceptable without departing from the scope of the present invention.

The lexical graph area 308 is similar in design to a folders viewing area of a file system interface, such as Windows Explorer. However, the individual items shown are lexical nodes as determined by the generator 38. The lexical nodes or metadata elements are identified by their term name from the data dictionary. For example, a node 324 is titled business_code. The business_code node 324 is the top node in a subgraph of nodes. Each node that includes dependent nodes includes an expandable plus sign next to the node term for allowing the user to activate a cursor on that plus sign for expanding the view in order to see all the node's dependent nodes. This is similar to what is presently used for folders in Windows Explorer by Microsoft. Also displayed adjacent to each node is one of three graphical icons: a green light; a caution symbol; and a cycle symbol. The green light symbol next to a node indicates that the node is acyclic and stable. A caution symbol displayed next to a node indicates that the node is experiencing unstable tendencies and is acyclic, such as business node 320. The determination for when to display a caution symbol is described below with respect to FIGS. 7A–E. A cyclic symbol next to a node indicates that the node is cyclical with another node.

When a user highlights a node in the graph area 308 by activating a curser on the node, the details of that node and/or its dependent nodes are displayed in the node definition area 310. In area 310 the following columns of information are shown: term; definition; used by; uses; incoming; outgoing; lexical; aggregate; and fractional. The term column presents the nodes term. The definition column presents the nodes definition, the used by column presents the terms used by the definition of the current term. The uses column presents the terms that use the current term in their definition. The incoming column presents the number of incoming nodes or children/client nodes to the node identified in that row and the outgoing column presents the number of nodes or parent/server nodes that the node is a lexical dependent. The lexical column presents the node's lexical stability value, the aggregate column presents the node's aggregate stability value, and the fractional column presents the node's fractional stability value.

Figure 9:
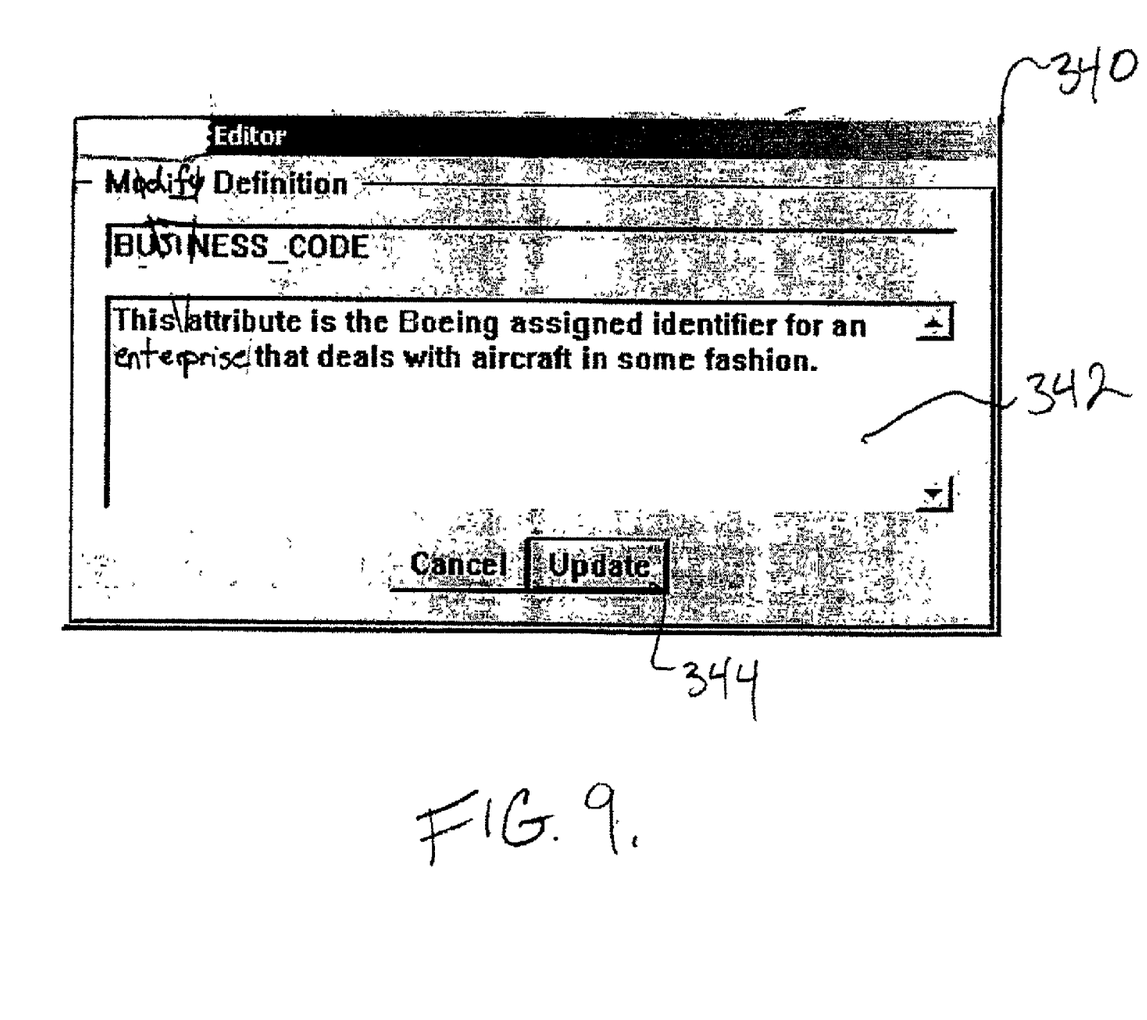
Figure 10:
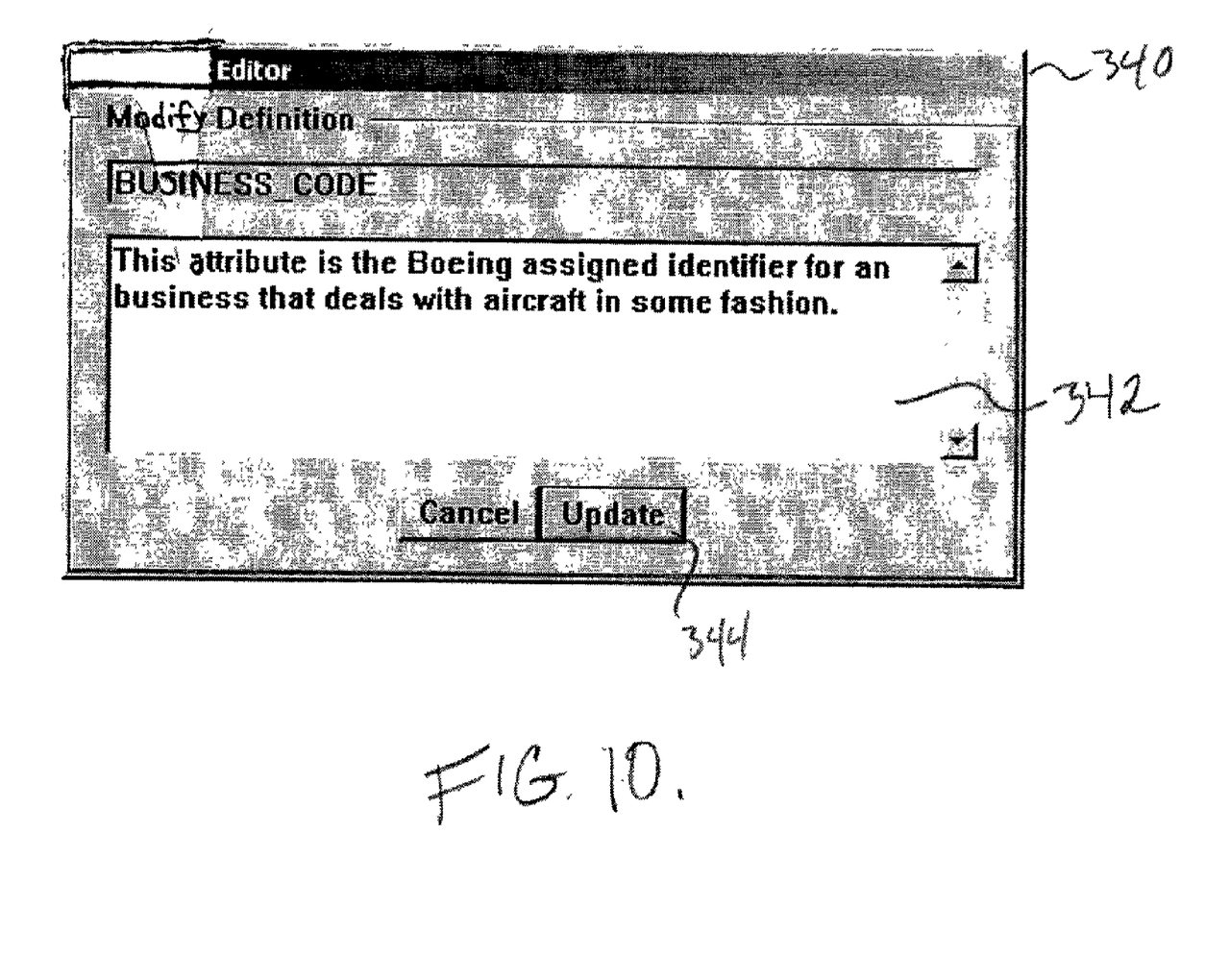
Figure 11:
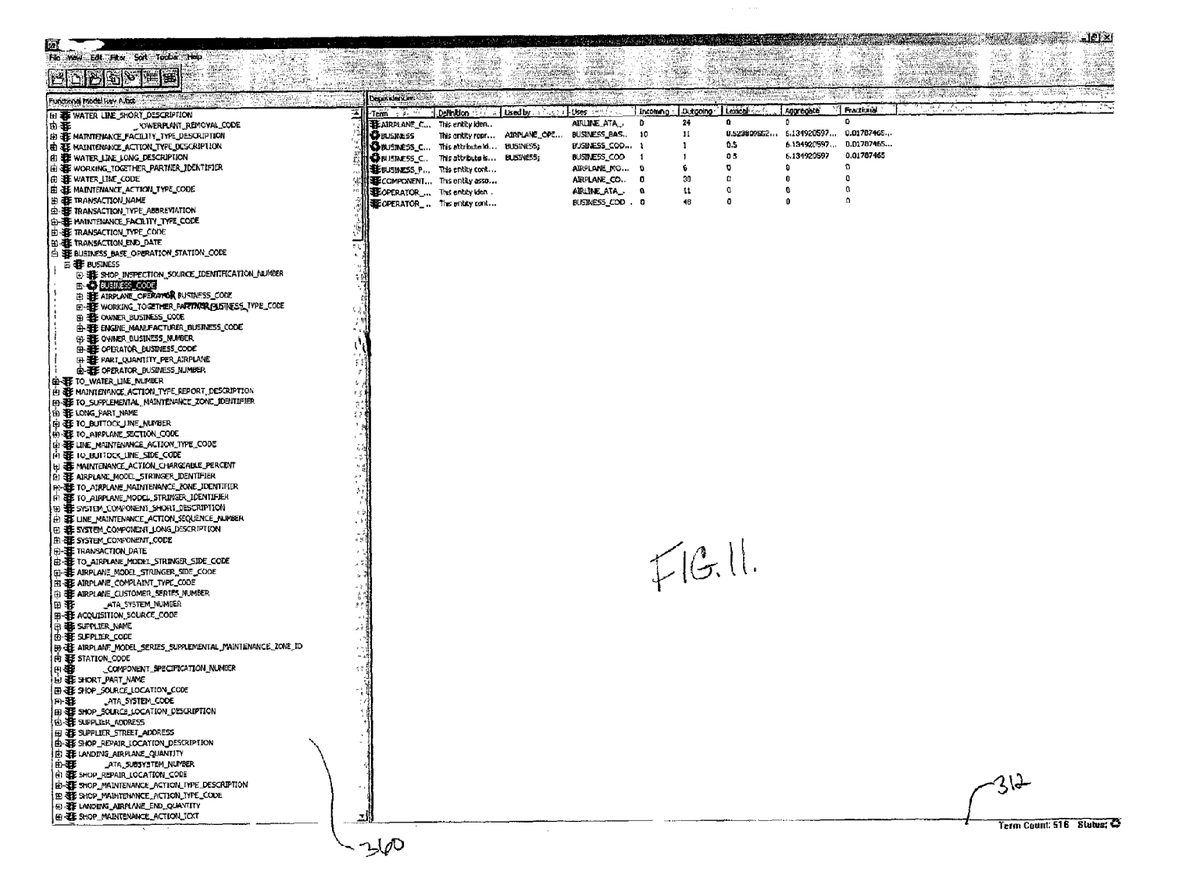

FIG. 9 illustrates an editor window 340 that is displayed when a user desires to modify a node's definition. In this example the node to be modified is the business_code node 324, shown in FIG. 8. The window 340 includes a definition display area 342 that allows a user to edit the words of the definition that are displayed in the display area using the user interface 26. Once the user has edited the definition in the definition area 342, the user selects an update button 344 for inserting the edited definition into the associated node and performing a recalculation of the lexical graph based on the edited definition. For example, as shown in FIG. 10, the word "enterprise" on the second line of the definition for business_code is changed to "business." Upon selection of the update button 344, the generator 38 generates a new lexical graph 360 as shown in FIG. 11 based on the modified definition. The generator 38 parses the modified definition of business_code and determined that a cyclic dependency has occurred, because the new term that was entered, "business," is the term of a child node for the business_code node 324, as shown in graph area 308 of FIG. 8. Business depends on business_code and business_code depends on business. Therefore, the structure of the graph is reordered and the nodes experiencing cyclic tendencies are displayed with a cyclic symbol next to their term.

The status bar 312 indicates a term count and worst status present within the entire data dictionary. The term count is the number of nodes in the analyzed data dictionary. Regarding the status shown in the status bar 312, as shown in FIG. 8 the caution symbol is shown because no cyclic nodes occur with only a couple of caution notes present. As shown in FIG. 11, since cyclic nodes occur a cyclic symbol is shown in the status section of the status bar 312.

Figure 12:
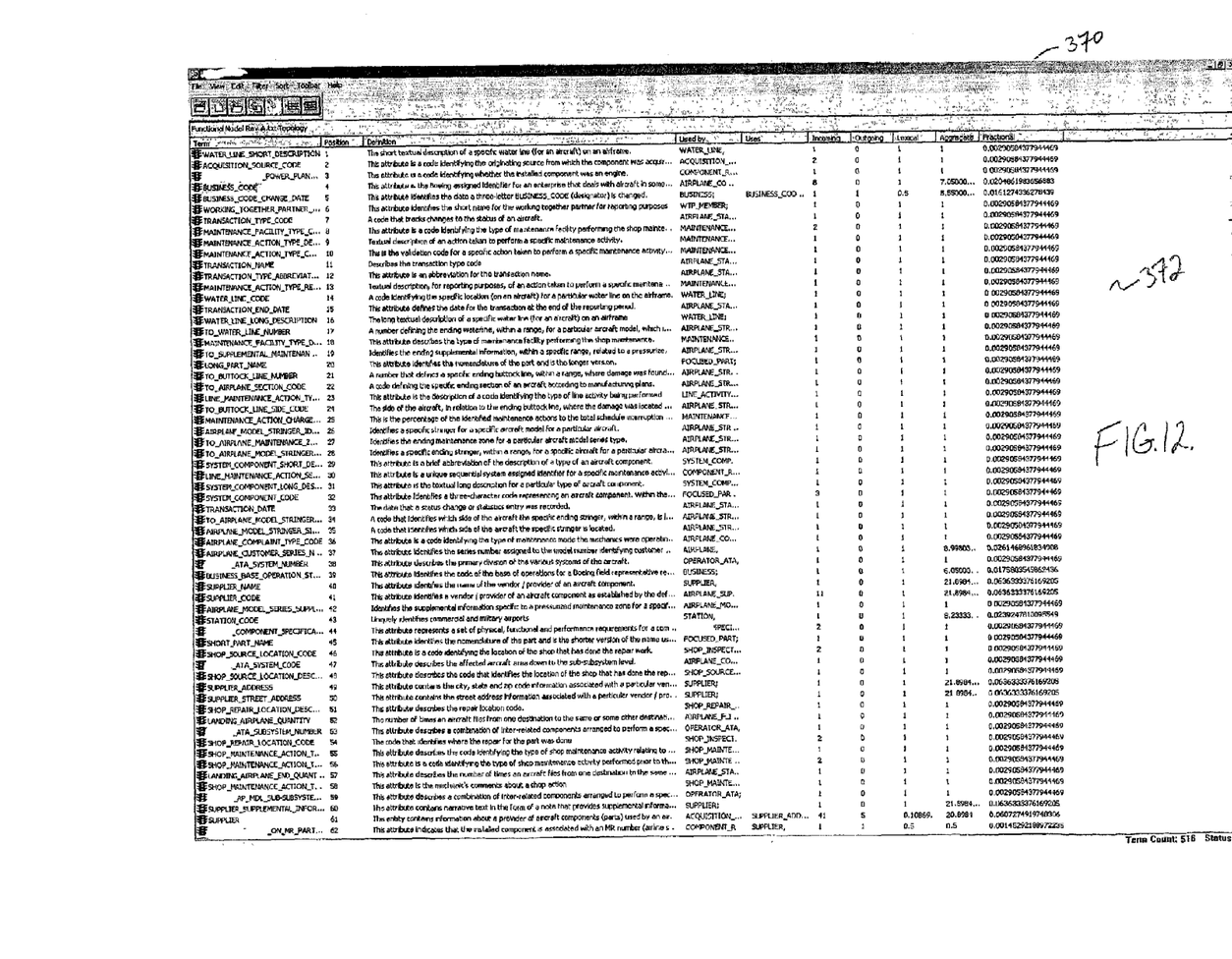

FIG. 12 illustrates a topology view of the analyzed data dictionary. The order of the nodes in the topology view is based on a priority of coupling relations between dictionary terms.

Figure 13:
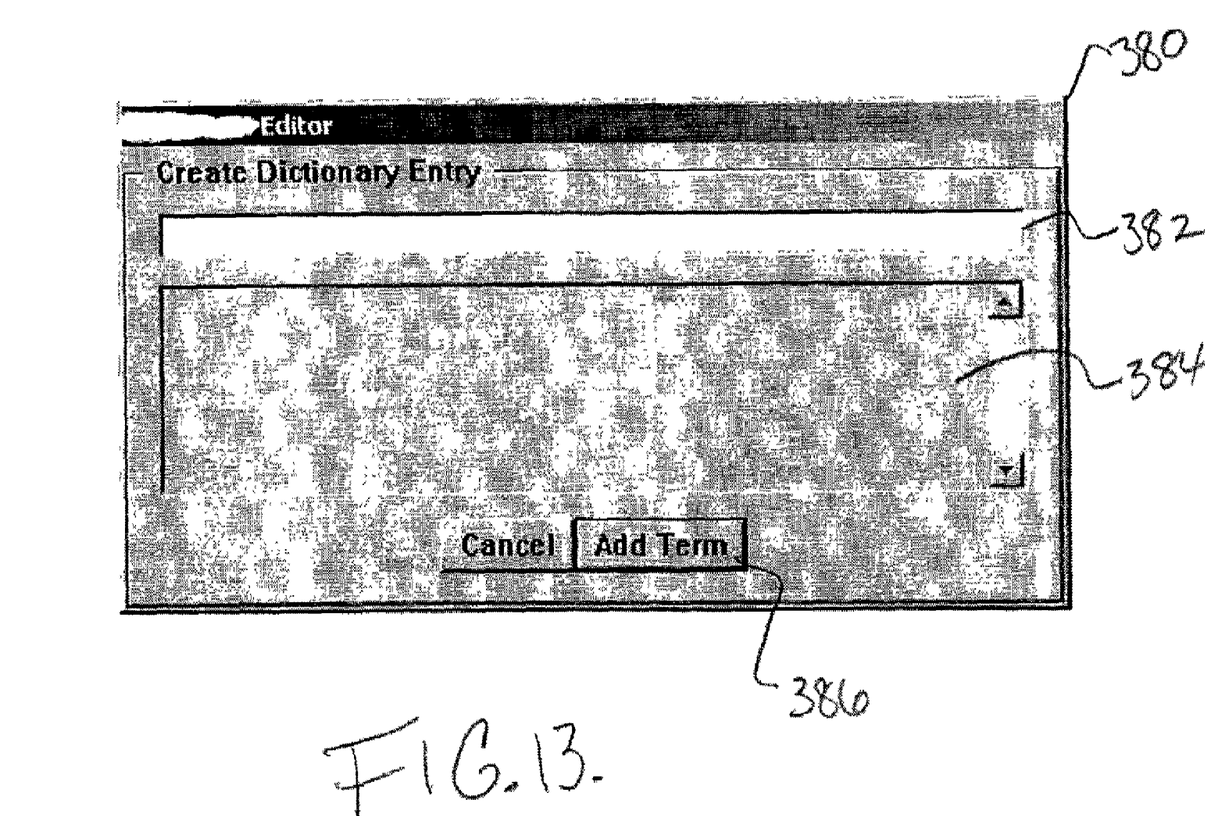

FIG. 13 illustrates a create dictionary entry window 380. The entry window 380 allows a user to add a term into an existing data dictionary or to create a new data dictionary from scratch one node at a time. The entry window 380 includes a title area 382, a definition area 384, and an add term button 386. The user enters their desired term name in the term area 382, and the terms definition in area 384. Once the user is satisfied with the entry of the term and the term definition the user selects the add term button 386 to add the term into the existing or new data dictionary. All editor windows also include a cancel button for canceling the operation being performed.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A computer-based method for viewing a data dictionary structure, the method comprising:
   retrieving a data dictionary including metadata terms and their definitions;
   creating a plurality of lexical nodes of the data dictionary based on the metadata terms, wherein each node is associated with a metadata term and the metadata term's definition;
   parsing each metadata term's definition;
   determining dependencies of each lexical node based on the parsed definitions and the metadata terms associated with other determined lexical nodes;
   generating a lexical graph based on the plurality of created lexical nodes and the determined dependencies; and
   displaying at least a portion of the generated lexical graph.

2. The method of claim 1, wherein the determined dependencies are selected from a list consisting of a non-caution, non-cyclical type dependency, a caution type dependency, and a cyclical type dependency.

3. The method of claim 2, wherein generating a lexical graph comprises generating node icons based on the dependency type.

4. The method of claim 1, further comprising determining a lexical stability value for each lexical node.

5. The method of claim 4, further comprising displaying the determined lexical stability value with the associated lexical node in the lexical graph.

6. The method of claim 4, wherein determining the lexical stability value comprises dividing the number of nodes that lexically depend on a current node by the number of nodes that lexically depend on the current node plus the number of nodes that the current node lexically depends from.

7. The method of claim 4, further comprising determining an aggregate stability value for each node.

8. The method of claim 7, further comprising displaying the aggregate stability value for each lexical node.

9. The method of claim 7, wherein determining the aggregate stability value of a current node comprises adding the lexical stability values of all nodes that are lexically dependent upon the current node to the current node's lexical stability value.

10. The method of claim 7, further comprising:
    determining a global stability value by summing the lexical stability values of all nodes of the generated lexical graph; and
    determining a fractional stability value for each node based on the determined aggregate and global stability values.

11. The method of claim 10, further comprising displaying the determined fractional stability value for each lexical node.

12. The method of claim 10, wherein determining the fractional stability for a current node comprises dividing the current node's aggregate stability value by the global stability value.

13. The method of claim 1, further comprising:
    modifying at least one definition associated with the metadata terms of one or more lexical nodes;
    parsing the at least one modified definition;
    redetermining dependencies of each lexical node based on the previous parsed definitions, the parsed modified definition, and the metadata terms associated with the other lexical nodes; and
    regenerating the lexical graph based on the redetermined dependencies.

14. The method of claim 1, further comprising:
    adding a lexical node by inserting a metadata term and metadata term definition;
    parsing the metadata term definition of the added lexical node;
    redetermining dependencies based on the previous parsed definitions, the parsed definition of the added lexical node, and the metadata terms associated with the other lexical nodes; and
    regenerating the lexical graph based on the redetermined dependencies.

15. A computer system for viewing a data dictionary structure, the system comprising:
    a processor comprising:
        a first component configured to retrieve a data dictionary including metadata terms and their definitions;
        a second component configured to create a plurality of lexical nodes of the data dictionary based on the metadata terms, wherein each node is associated with a metadata term and the metadata term's definition;
        a third component configured to parse each metadata term's definition;
        a fourth component configured to determine dependencies of each lexical node based on the parsed definitions and the metadata terms associated with the other lexical nodes;
        a fifth component configured to generate a lexical graph based on the created plurality of lexical nodes and the determined dependencies; and
    a display coupled to the processor and configured to display at least a portion of the generated lexical graph.

16. The system of claim 15, wherein the determined dependencies are selected from a list consisting of a non-caution, non-cyclical type dependency, a caution type dependency, and a cyclical type dependency.

17. The system of claim 16, wherein the fifth component is further configured to generate node icons based on the dependency type.

18. The system of claim 15, wherein the processor further comprises a sixth component configured to determine a lexical stability value for each lexical node.

19. The system of claim 18, wherein the display is farther configured to display the determined lexical stability value with the associated lexical node in the lexical graph.

20. The system of claim 18, wherein the sixth component determines the lexical stability value by dividing the number of nodes that lexically depend on a current node by the number of nodes that lexically depend on the current node plus the number of nodes that the current node lexically depends from.

21. The system of claim 18, wherein the processor further comprises a seventh component configured to determine an aggregate stability value for each node.

22. The system of claim 21, wherein the display is further configured to display the aggregate stability value for each lexical node.

23. The system of claim 21, wherein the seventh component determines the aggregate stability value by adding the lexical stability values of all nodes that are lexically dependent upon the current node to the current node's lexical stability value.

24. The system of claim 21, further comprising:
    an eighth component configured to determine a global stability value by summing the lexical stability values of all nodes of the generated lexical graph; and a ninth component configured to determine a fractional stability value for each node based on the determined aggregate and global stability values.

25. The system of claim 24, wherein the display is further configured to display the determined fractional stability value for each lexical node.

26. The system of claim 24, wherein the ninth component determines the fractional stability value by dividing the current node's aggregate stability value by the global stability value.

27. The system of claim 15, further comprising:
a modifying component configured to modify at least one definition associated with the metadata terms of one or more lexical nodes;
wherein the third component parses the at least one modified definition, the fourth component redetermines dependencies of each lexical node based on the previous parsed definitions, the parsed modified definition, and the metadata terms associated with the other lexical nodes, and the fifth component regenerates the lexical graph based on the redetermined dependencies.

28. The system of claim 15, further comprising:
a modifying component configured to add a lexical node by inserting a metadata term and metadata term definition;
wherein the third component parses the metadata term definition of the added lexical node, the fourth component redetermines dependencies of each lexical node based on the previous parsed definitions, the parsed definition of the added lexical node, and the metadata terms associated with the other lexical nodes, and the fifth component regenerates the lexical graph based on the redetermined dependencies.

* * * * *